(12) United States Patent
Cloyd et al.

(10) Patent No.: US 6,540,426 B2
(45) Date of Patent: Apr. 1, 2003

(54) PASSIVE BALL CAPTURE JOINT

(75) Inventors: Richard A. Cloyd, Huntsville, AL (US); Thomas C. Bryan, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/949,408

(22) Filed: Sep. 4, 2001

(65) Prior Publication Data

US 2003/0044226 A1 Mar. 6, 2003

(51) Int. Cl.[7] ................................................. F16C 11/00
(52) U.S. Cl. ..................... 403/122; 403/322.2; 280/511
(58) Field of Search ................................. 403/122, 135, 403/143, 136, 137, 138, 322.2, 321, 328; 280/511, 513, 901

(56) References Cited

U.S. PATENT DOCUMENTS

| 1,618,851 | A | * | 2/1927 | Thunberg et al. | 403/328 |
|---|---|---|---|---|---|
| 1,621,811 | A | * | 3/1927 | Richard et al. | 403/328 |
| 2,314,870 | A | * | 3/1943 | Dayton | 280/513 |
| 2,377,368 | A | * | 6/1945 | Polstra | 280/513 |
| 2,957,714 | A | * | 10/1960 | Langen | 403/135 |
| 3,129,023 | A | * | 4/1964 | Fierstine | 403/122 |
| 5,601,380 | A | * | 2/1997 | Guthrie et al. | 403/328 X |
| 5,735,488 | A | * | 4/1998 | Schneider | |
| 6,186,693 | B1 | | 2/2001 | Cloyd et al. | |
| 6,409,428 | B1 | * | 6/2002 | Moog | |

FOREIGN PATENT DOCUMENTS

| FR | 549529 | * | 11/1922 | 403/138 |
|---|---|---|---|---|
| GB | 698473 | * | 10/1953 | 403/137 |
| JP | 62292915 | | * 12/1987 | 403/122 |

* cited by examiner

Primary Examiner—Anthony Knight
Assistant Examiner—Ryan Flandro
(74) Attorney, Agent, or Firm—James J. McGroary

(57) ABSTRACT

A passive ball capture joint has a sleeve with a plurality of bores distributed about a circumference thereof and formed therethrough at an acute angle relative to the sleeve's longitudinal axis. A spring-loaded retainer is slidingly fitted in each bore and is biased such that, if allowed, will extend at least partially into the sleeve to retain a ball therein. A ring, rotatably mounted about the bores, has an interior wall defining a plurality of shaped races that bear against the spring-loaded retainers. A mechanized rotational force producer is coupled to the ring. The ring can be rotated from a first position (that presses the retainers into the sleeve to lock the ball in place) to a second position (that allows the retainers to spring back out of the sleeve to release the ball).

15 Claims, 3 Drawing Sheets

PASSIVE BALL CAPTURE JOINT

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to ball capture joints. More specifically, the invention is a passive ball capture joint that can be positively and rigidly locked into position once capture has occurred and that includes an ejection mechanism when the joint is to be uncoupled.

2. Description of the Related Art

A wide variety of "snap together" joint couplings are known in the art. Included in this class of joints are ball-type joints which are often used in automotive linkages. Such ball joints are characterized by low cost and very low strength in the axial direction as they are generally used to transmit forces in a plane normal to the installation axis. Further, these joints are not generally considered useful as passive capture joints since they require more force to assemble than they can safely transmit in the axial direction.

A snap-fit ball joint design that can be used as a passive capture joint having three degrees of freedom is disclosed in U.S. Pat. No. 6,186,693. In this particular passive capture joint, a joint ball mounted on a stem is received in an inventive socket. The socket consists of a base having an exterior wall and forms an interior chamber having a top end, a bottom end and an interior wall. The interior chamber is open at the top end and forms a spherical cup at the bottom end. The socket base's interior chamber is sized to accept the joint ball. The base also forms at least one bore at an acute angle away from the interior chamber's open end. The bores have a first opening in the interior wall of the chamber and a second opening in the exterior wall of the base. Retaining balls sized to fit within the bores, but to only partially pass through the first opening, are movably housed within the bores. The retaining balls are movably held in the first opening by a compression spring housed in the bore. As the joint ball is inserted in the chamber, it forces the retaining balls back into the bore until the equator of the joint ball passes. Because the bore is at an acute angle to the interior chamber, the joint ball cannot exit the chamber without the joint being unlocked. The joint is manually unlocked by rotating a locking ring which encircles the base and covers the second opening. The locking ring has a radial slot for each retaining ball. The radial slot is disposed angularly from the base and is sized to allow passage of the retaining ball in the radial direction when the locking ring is manually rotated to align the radial slot with the second opening. However, there are many applications (e.g., space vehicle docking, underwater capture, etc.) that do not lend themselves to the above-described manual unlocking structure. Further, certain capture applications require a rigid joint once capture has occurred.

SUMMARY OF THE INVENTION

Accordingly, it is an object of the present invention to provide a passive ball capture joint.

Another object of the present invention is to provide a passive ball capture joint having a mechanized unlocking structure.

Still another object of the present invention is to provide a passive ball capture joint having a mechanized structure for making the joint a rigid one.

A still further object of the present invention is to provide a passive ball capture joint that facilitates ejection of the captured ball once the joint has been unlocked.

Other objects and advantages of the present invention will become more obvious hereinafter in the specification and drawings.

In accordance with the present invention, a passive ball capture joint has a sleeve defining a first open end and a second open end opposing one another along the sleeve's longitudinal axis. The sleeve has a plurality of bores distributed about a circumference thereof and formed therethrough at an acute angle relative to the longitudinal axis. The acute angle is such that it diverges outward from the sleeve's longitudinal axis in a direction defined by the sleeve's first open end to its second open end. A spring-loaded retainer is slidingly fitted in each bore and is biased such that, if allowed, will extend at least partially into the sleeve. A receiver, slidingly engaged in the sleeve second open end, has a cupped portion facing the sleeve's first open end. A ring is rotatably mounted about the sleeve and intersects the bores. The ring has an interior wall defining a plurality of shaped races. Each race bears against one of the spring-loaded retainers. At a first rotational position of the ring, each race permits its respective spring-loaded retainer to achieve a first position defined by at least partial extension into the sleeve. At a second rotational position of the ring, each race permits its respective spring-loaded retainer to achieve a second position defined by the spring-loaded retainer being positioned further radially outward from the sleeve's longitudinal axis as compared to the first position. A mechanized axial force producer is coupled to the receiver to apply an axial force thereto so that the receiver is biased towards the sleeve's first open end. A mechanized rotational force producer is coupled to the ring to apply a rotational force thereto so that the ring can be rotated from its first rotational position to its second rotational position.

In order to capture a joint ball, the ring is in its first rotational position. Once captured, the receiver is pressed axially against the joint ball to firmly seat the joint ball between the receiver and the spring-loaded retainers. When the joint ball is to be ejected, the ring is rotated to its second rotational position while the receiver continues to have the axial force applied thereto. As a result, each spring-loaded retainer is moved from its first position to its second position as the joint ball moves axially out of the sleeve.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
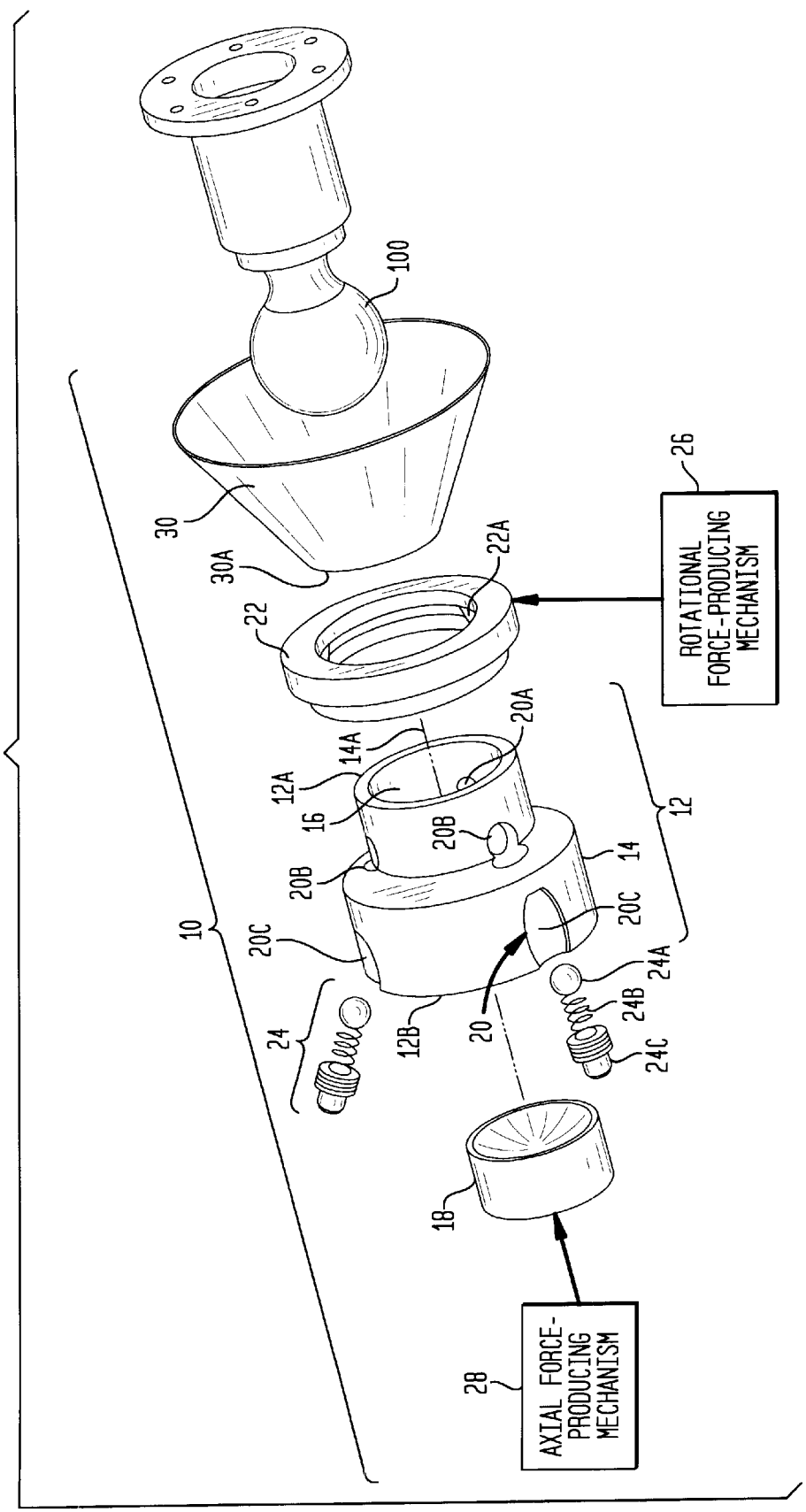
FIG. 1 is an exploded, part schematic view of an embodiment of the passive ball capture joint in accordance with the present invention.

Referring now to the drawings, and more particularly to FIG. 1, an exploded view of a passive ball capture joint in accordance with the present invention is shown and referenced generally by reference numeral 10. Ball capture joint 10 is designed to passively capture and lock onto a joint ball 100, the particular design of which is not a limitation of the present invention. Further, ball capture joint 10 can be selectively unlocked and simultaneously eject joint ball 100.

In general, ball capture joint 10 includes a socket assembly, a lock/unlock ring coupled to the socket assembly, and a rigidizing/ejection assembly. More specifically, the socket assembly includes an open-ended sleeve 12 defined by a base 14 having an exterior wall forming a chamber 16 having an interior wall. Chamber 16 is sized to receive joint ball 100 therein via open end 12A of sleeve 12. A ball receiving load/eject cup 18 is sized to slide within chamber 16 via an axial force applied thereto at open end 12B as will be explained further below. Base 14 has at least one bore 20 formed therethrough, and typically has a plurality of such bores distributed symmetrically about base 14. For example, three of bores 20 can be angularly spaced apart from one another about base 14 by 120°.

Each bore 20 forms an acute angle α relative to the longitudinal axis 14A of base 14. Angle α angles away or diverges from open end 12A. Each bore 20 is defined by a series of aligned openings with a first opening 20A in the interior wall of chamber 16, and second and third openings 20B and 20C, respectively, in the exterior wall of base 14. A locking ring 22 rotatably encircles base 14, intersects each bore and covers second opening 20B. Owing to acute angle α, third opening 20C is also formed in the exterior wall of base 14 and is sized to receive a spring-loaded ball retainer system 24. By way of example, system 24 can include a retaining ball 24A, a spring 24B and a threaded plug 24C for insertion/engagement with bore 20 via third opening 20C.

Locking ring 22 can be rotated relative to base 14 between a locked and unlocked position as will be explained further below. Locking ring 22 incorporates a radial slot 22A for cooperation with each retaining ball 24A as ring 22 is rotated. Slot 22A is shaped to bear against a retaining ball 24A in all rotational positions of ring 22. As will be explained further below, in the first of two extreme rotational positions of ring 22, each slot 22A allows each spring 24B to press/bias a retaining ball 24A into chamber 16 to capture/retain joint ball 100. In the second of the two extreme rotational positions of ring 22, slot 22A allows each retaining ball 24A to move radially outward from chamber 16 thereby allowing the axial passage of joint ball 100. Rotational movement of ring 22 is caused by means of a rotational force-producing mechanism 26 which is coupled to ring 22. Mechanism 26 can be any mechanized means capable of bringing about the rotational movement of ring 22 between its two extreme rotational positions.

As mentioned above, ball receiving load/eject cup 18 slides in open end 12B and is retained and moved in chamber 16 by means of an axial force-producing mechanism 28 that is coupled to cup 18. Mechanism 28 can be any mechanized means capable of axially moving/biasing cup 18 towards open end 12A for purpose of making the captured joint ball coupling rigid and for applying an axial ejection force to the joint ball when it is to be released.

To compensate for translational misalignment of joint ball 100 during the capture process, ball capture joint 10 can also include an alignment cone 30 that has its tapered end 30A coupled to open end 12A of sleeve 12. Thus, alignment cone 30 directs a misaligned joint ball 100 into chamber 16 for capture as will now be explained.

Figure 2:
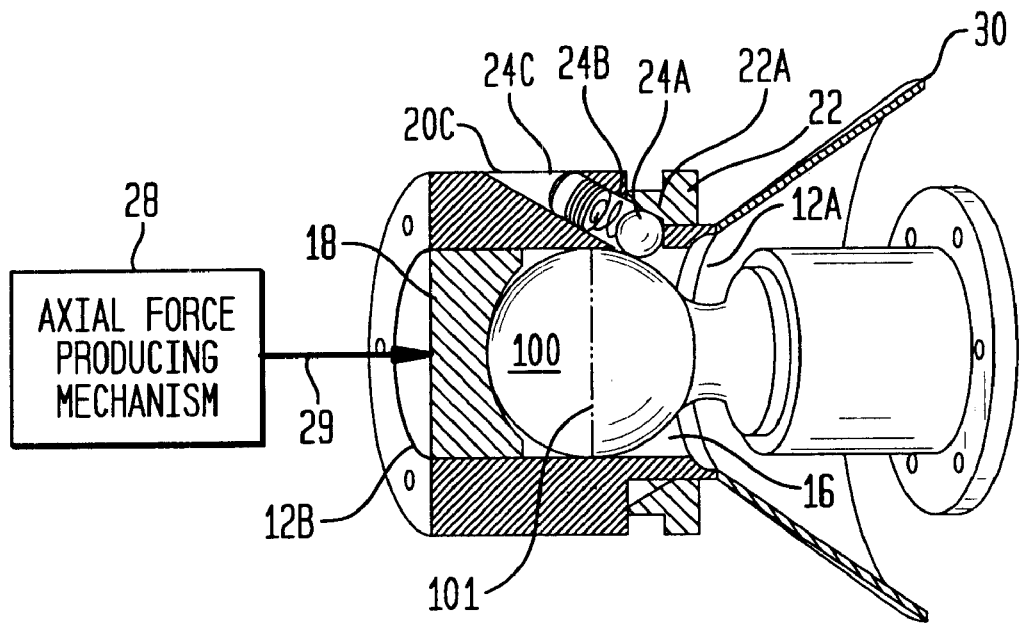
FIG. 2 is an isolated cross-sectional view of the socket assembly and locking ring with a joint ball captured therein.
Figure 3:
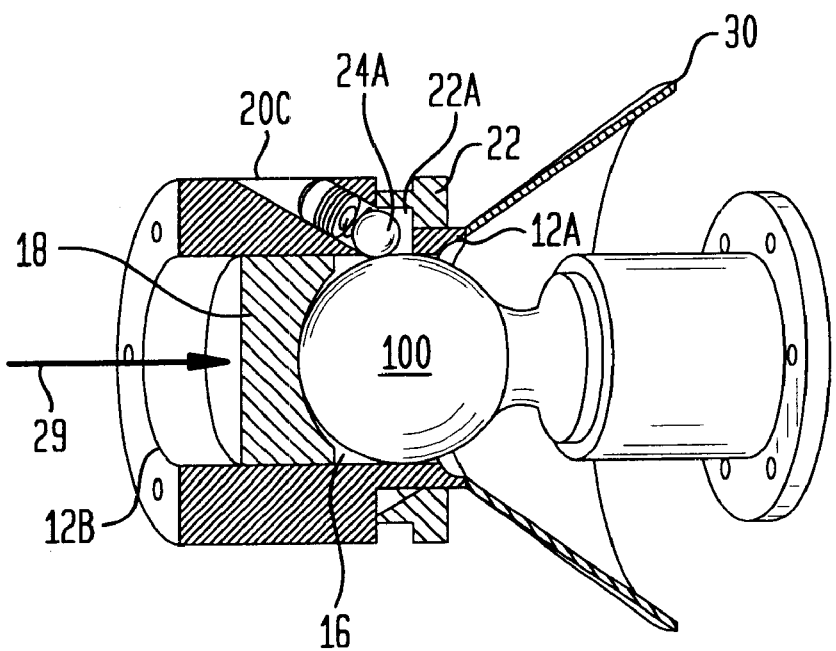
FIG. 3 is an isolated cross-sectional view of the socket assembly and locking ring with the joint ball being released.

Referring additionally now to FIGS. 2 and 3, isolated cross-sectional views are shown of the socket assembly, locking ring and joint ball with the joint ball being captured in FIG. 2 and released in FIG. 3. In FIG. 2, ring 22 is rotationally positioned in its first extreme rotational position so that slot 22A allows retaining ball 24A to be pressed partially into chamber 16 by spring 24B. That is, in this position, joint ball 100 can enter open end 12A and press against retaining ball 24A to compress spring 24B. This is possible owing to the acute angle of bore 20. Once the equator 101 of joint ball 100 has passed retaining balls 24A, they snap back to partially enter chamber 16 as illustrated. In order to make the capture of joint ball 100 rigid, axial force-producing mechanism 28 applies axial force 29 to cup 18.

When it is desired to release/eject joint ball 100, ring 22 is rotated by rotational force-producing mechanism 26 (not shown in FIG. 3) to its second extreme rotational position illustrated in FIG. 3. In this second extreme rotational position, the shape and size of slot 22A is such that retaining ball 24A can move radially outward and clear chamber 16. The continually applied axial force 29 now serves to eject joint ball 100 from chamber 16.

Figure 4:
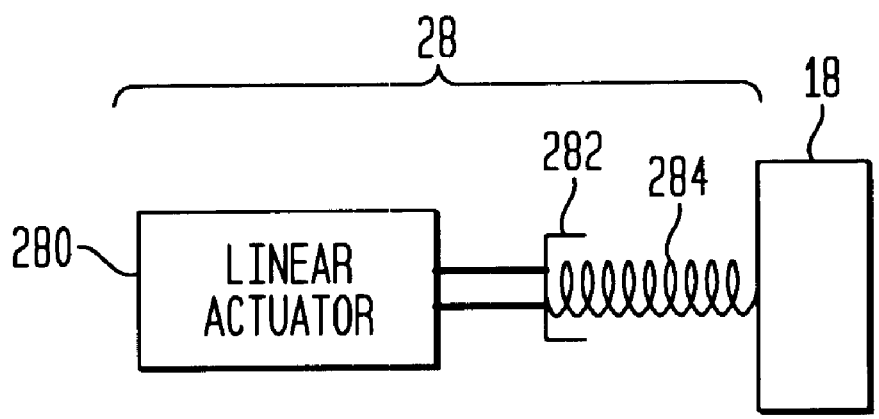
FIG. 4 is a schematic side view of an embodiment of an axial force-producing mechanism used in the present invention.

While a variety of embodiments of axial force-producing mechanism 28 can be used without departing from the scope of the present invention, an illustrative embodiment will be described with the aid of FIG. 4. Specifically, mechanism 28 can comprise a linear actuator 280, a spring cup 282 and a spring 284. When linear actuator 280 is operated to drive spring cup 282 axially towards cup 18, spring 284 compresses and applies its bias force to cup 18.

Figure 5:
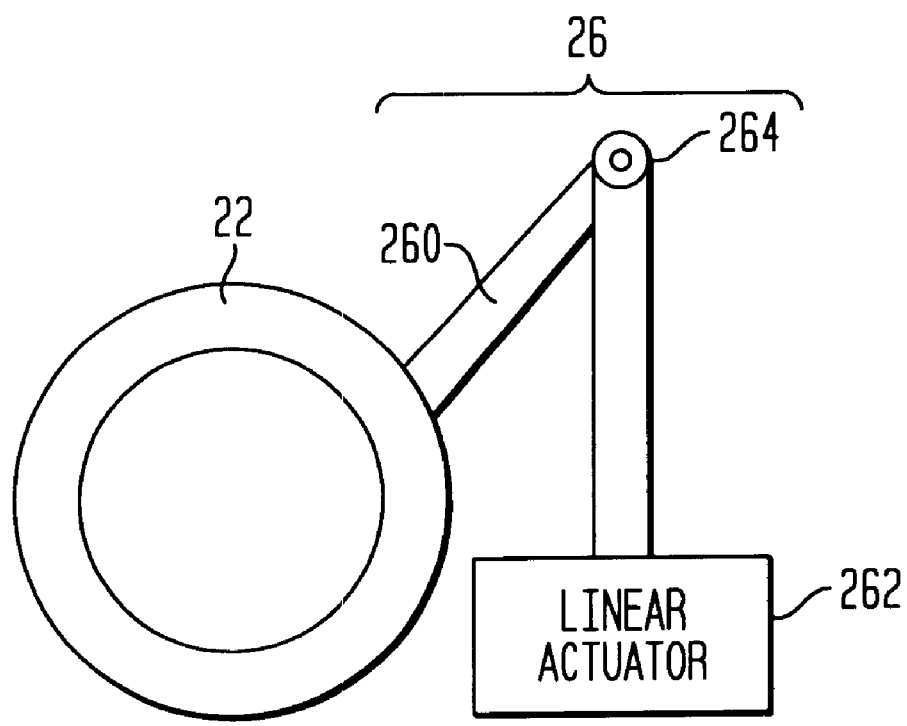
FIG. 5 is a plan view of an embodiment of a rotational force-producing mechanism used in the present invention.

Similarly, while a variety of embodiments of rotational force-producing mechanism 26 can be used without departing from the scope of the present invention, an illustrated embodiment will be described with the aid of FIG. 5. Specifically, mechanism 26 can comprise an arm 260 extending radially out from ring 22, a linear actuator 262, and a hinge 264 for pivotally coupling actuator 262 to arm 260. When linear actuator 262 is operated, the linear driving force produced thereby is converted to a rotational force acting on ring 22 by hinge 264 and arm 260.

The advantages of the present invention are numerous. A joint ball can be passively captured with the capture position being subsequently axially loaded to make the joint rigid. When the joint ball is to be released, the same axial loading force acts as an ejection force to ensure that the joint ball clears the ball capture joint.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A passive ball capture joint, comprising:
   a sleeve having a longitudinal axis with a first open end and a second open end opposing one another along said longitudinal axis, said sleeve having a plurality of bores distributed about a circumference thereof and formed therethrough at an acute angle relative to said longitudinal axis, said acute angle diverging outward from said longitudinal axis in a direction defined by said first open end to said second open end;

a spring-loaded retainer slidingly fitted in each of said plurality of bores and biased to extend at least partially into said sleeve;

a receiver slidingly engaged in said second open end of said sleeve, said receiver having a cupped portion facing said first open end of said sleeve;

a ring rotatably mounted about said sleeve and intersecting said plurality of bores, said ring having an interior wall defining a plurality of shaped races, each of said plurality of shaped races bearing against one said spring-loaded retainer for, at a first rotational position of said ring, permitting each said spring-loaded retainer to achieve a first position in which each said spring-loaded retainer extends at least partially into said sleeve and, at a second rotational position of said ring, permitting each said spring-loaded retainer to achieve a second position in which each said spring-loaded retainer is positioned further radially outward from said longitudinal axis as compared to said first position;

an axial force producer coupled to said receiver for applying an axial force thereto wherein said receiver is biased towards said first open end; and a rotational force producer coupled to said ring for applying a rotational force thereto wherein, when said ring is rotated from said first rotational position to said second rotational position, each said spring-loaded retainer moves from said first position to said second position, said rotational force producer comprising a coupling arm coupled to and extending radially outward from said ring, and an actuator pivotally coupled to said coupling arm wherein, when activated, said actuator causes rotation of said ring.

2. The passive ball capture joint as in claim 1 further comprising a cone coupled to and diverging outward from said first open end of said sleeve.

3. The passive ball capture joint as in claim 1 wherein said plurality of bores are distributed symmetrically about said circumference.

4. The passive ball capture joint as in claim 1 wherein said plurality of bores comprise three bores distributed symmetrically about said circumference.

5. The passive ball capture joint as in claim 1 wherein said spring-loaded retainer comprises:

a ball; and means for biasing said ball into said sleeve.

6. The passive ball capture joint as in claim 1 wherein said axial force producer comprises:

a linear actuator; and a spring mechanism coupled between said linear actuator and said receiver wherein, when activated, said linear actuator compresses said spring mechanism.

7. A passive ball capture joint, comprising:

a sleeve having a longitudinal axis with a first open end and a second open end opposing one another along said longitudinal axis, said sleeve having a plurality of bores distributed about a circumference thereof and formed therethrough at an acute angle relative to said longitudinal axis, said acute angle diverging outward from said longitudinal axis in a direction defined by said first open end to said second open end;

a spring-loaded retainer slidingly fitted in each of said plurality of bores and biased to extend at least partially into said sleeve;

a receiver slidingly engaged in said second open end of said sleeve, said receiver having a cupped portion facing said first open end of said sleeve;

a ring rotatably mounted about said sleeve and intersecting said plurality of bores, said ring having an interior wall defining a plurality of shaped races, each of said plurality of shaped races bearing against one said spring-loaded retainer for, at a first rotational position of said ring, permitting each said spring-loaded retainer to achieve a first position in which each said spring-loaded retainer extends at least partially into said sleeve and, at a second rotational position of said ring, permitting each said spring-loaded retainer to achieve a second position in which each said spring-loaded retainer is positioned further radially outward from said longitudinal axis as compared to said first position;

a first linear actuator;

a spring mechanism coupled between said first linear actuator and said receiver wherein, when activated, said first linear actuator compresses said spring mechanism;

a coupling arm coupled to and extending radially outward from said ring; and a second linear actuator pivotally coupled to said coupling arm for applying a rotational force thereto wherein, when activated, said second linear actuator causes rotation of said ring between said first rotational position and said second rotational position.

8. The passive ball capture joint as in claim 7 further comprising a cone coupled to and diverging outward from said first open end of said sleeve.

9. The passive ball capture joint as in claim 7 wherein said plurality of bores are distributed symmetrically about said circumference.

10. The passive ball capture joint as in claim 7 wherein said plurality of bores comprise three bores distributed symmetrically about said circumference.

11. The passive ball capture joint as in claim 7 wherein said spring-loaded retainer comprises:

a ball; and means for biasing said ball into said sleeve.

12. A passive ball capture joint, comprising:

a base forming an interior chamber having an interior wall, an exterior wall, and first and second open ends, said base having at least one bore set at an acute angle away from said first open end of said chamber, said at least one bore having a first opening in said interior wall of said chamber and a second opening in said exterior wall;

a retaining ball housed within said at least one bore and sized to fit movably within said at least one bore and extend partially out of said first opening;

a means for biasing said retaining ball towards said first opening;

a receiver slidingly engaged in said second open end of said base, said receiver having a cupped portion facing said first open end;

a locking ring rotatably mounted about said base and covering said second opening, said locking ring having an interior wall forming a radial slot for said retaining ball, said radial slot shaped and sized to allow said retaining ball passage in the radial direction when said locking ring is rotated about said base;

a mechanized axial force producer coupled to said receiver for applying an axial force thereto wherein said receiver is biased towards said first open end; and a mechanized rotational force producer coupled to said locking ring for applying a rotational force thereto.

13. The passive ball capture joint as in claim 12 further comprising a cone coupled to and diverging outward from said first open end of said base.

14. The passive ball capture joint as in claim 12 wherein said mechanized axial force producer comprises:

a linear actuator; and a spring mechanism coupled between said linear actuator and said receiver wherein, when activated, said linear actuator compresses said spring mechanism.

15. The passive ball capture joint as in claim 12 wherein said mechanized rotational force producer comprises:

a coupling arm coupled to and extending radially outward from said ring; and an actuator pivotally coupled to said coupling arm wherein, when activated, said actuator causes rotation of said ring.

* * * * *